US 8,112,082 B2

(12) United States Patent
Nylander et al.

(10) Patent No.: US 8,112,082 B2
(45) Date of Patent: Feb. 7, 2012

(54) UNLICENSED-RADIO ACCESS NETWORKS IN MOBILE CELLULAR COMMUNICATION NETWORKS

(75) Inventors: Tomas Nylander, Värmdö (SE); Jari Tapio Vikberg, Jaerna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 129 days.

(21) Appl. No.: 10/591,953

(22) PCT Filed: Mar. 8, 2004

(86) PCT No.: PCT/EP2004/002357
§ 371 (c)(1),
(2), (4) Date: Sep. 8, 2006

(87) PCT Pub. No.: WO2005/086421
PCT Pub. Date: Sep. 15, 2005

(65) Prior Publication Data
US 2007/0184824 A1 Aug. 9, 2007

(51) Int. Cl.
*H04W 4/00* (2009.01)
(52) U.S. Cl. ........ 455/433; 455/444; 455/445; 455/458; 455/436; 370/522; 370/328; 370/331
(58) Field of Classification Search .................. 455/436, 455/434, 458, 443, 422, 432, 435, 555; 370/329
See application file for complete search history.

(56) References Cited

U.S. PATENT DOCUMENTS

| | | | |
|---|---|---|---|
| 5,485,163 A | | 1/1996 | Singer et al. |
| 5,519,706 A | * | 5/1996 | Bantz et al. ................ 455/435.2 |
| 5,794,149 A | | 8/1998 | Hoo |
| 6,061,337 A | | 5/2000 | Light et al. |
| 6,144,709 A | | 11/2000 | Piirainen et al. |
| 6,477,382 B1 | | 11/2002 | Mansfield et al. |
| 6,487,410 B1 | | 11/2002 | Kontio et al. |

(Continued)

FOREIGN PATENT DOCUMENTS

EP 1 207 708 A 5/2002

(Continued)

OTHER PUBLICATIONS

International Search Report of PCT/EP2004/001539, mailed Dec. 10, 2004.

(Continued)

*Primary Examiner* — Kamran Afshar
*Assistant Examiner* — Kathy Wang-Hurst
(74) *Attorney, Agent, or Firm* — Nixon & Vanderhye, P.C.

(57) ABSTRACT

An unlicensed-radio access network is connected to a core network portion of a licensed cellular mobile network and includes a broadband network (302) with a plurality of access points (301) each defining a mini-cell and adapted to communicate with mobile stations located within a mini-cell over an unlicensed-radio interface. An access controller (303) is connected to the core network portion and to the broadband network. In accordance with the invention, the access controller (303) is associated with its own location area or areas in the licensed radio mobile network and comprises a database for storing the identification of mobile stations in association with at least one specific access point or broadband network address. This arrangement permits a mobile station to be locating within the access network in response to a paging signal from the core network without undue signalling load.

10 Claims, 4 Drawing Sheets

U.S. PATENT DOCUMENTS

| | | | |
|---|---|---|---|
| 7,127,250 B2 * | 10/2006 | Gallagher et al. | 455/436 |
| 2002/0019880 A1 | 2/2002 | Sakakura | |
| 2002/0058504 A1 * | 5/2002 | Stanforth | 455/426 |
| 2002/0077097 A1 | 6/2002 | Mizell et al. | |
| 2002/0197984 A1 | 12/2002 | Monin et al. | |
| 2003/0176186 A1 * | 9/2003 | Mohammed | 455/432.1 |
| 2004/0146021 A1 | 7/2004 | Fors et al. | |
| 2004/0208151 A1 * | 10/2004 | Haverinen et al. | 370/338 |
| 2004/0209615 A1 * | 10/2004 | Lamb et al. | 455/433 |
| 2005/0075112 A1 | 4/2005 | Ball et al. | |
| 2006/0019656 A1 | 1/2006 | Gallagher et al. | |
| 2007/0264996 A1 | 11/2007 | Vikberg | |
| 2007/0281696 A1 | 12/2007 | Vikberg et al. | |
| 2007/0291750 A1 | 12/2007 | Nylander et al. | |
| 2008/0119187 A1 | 5/2008 | Gallagher et al. | |
| 2008/0242298 A1 | 10/2008 | Nylander et al. | |

FOREIGN PATENT DOCUMENTS

| | | |
|---|---|---|
| EP | 1 207 708 A1 | 5/2002 |
| EP | 1 271 852 A | 1/2003 |
| EP | 1 351 530 A | 10/2003 |
| EP | 1 441 556 A | 7/2004 |
| GB | 2 313 257 A | 11/1997 |
| WO | 99/01002 A | 1/1999 |
| WO | 99/48312 A | 9/1999 |
| WO | 99/48312 A1 | 9/1999 |
| WO | 00/07402 A | 2/2000 |
| WO | 03/079706 A | 9/2003 |
| WO | 03/101128 A | 12/2003 |
| WO | 04/002051 A | 12/2003 |
| WO | 2004/068768 | 8/2004 |

OTHER PUBLICATIONS

Office Action mailed Jun. 22, 2010 in U.S. Appl. No. 10/589,873.
International Search Report of PCT/EP2004/002414, mailed Nov. 25, 2004.
Mahmood et al., "An Architecture for Integrating CDMA and 802.11 WLAN Networks", Vehicular Technology Conference, 2003, VTC 2003-Fall, 2003 IEEE 58th Orlando fl, Oct. 6-9, 2003, pp. 2073-2077, XP010701282.
Notice of Allowance mailed Dec. 9, 2010 in U.S. Appl. No. 10/589,873.
Office Action mailed Aug. 3, 2010 in U.S. Appl. No. 11/547,013.
International Search Report of PCT/EP2004/003367 mailed Nov. 25, 2004.
Office Action mailed Sep. 23, 2010 in U.S. Appl. No. 10/592,317.
International Search Report of PCT/EP2004/001115 mailed on Nov. 9, 2004.
Office Action mailed Feb. 9, 2009 in U.S. Appl. No. 10/588,658.
U.S. Final Office Action mailed Mar. 21, 2011 in U.S. Appl. No. 10/592,317.
International Search Report of PCT/EP2004/002357, mailed Nov. 9, 2004.

* cited by examiner

UNLICENSED-RADIO ACCESS NETWORKS IN MOBILE CELLULAR COMMUNICATION NETWORKS

This application is the U.S. national phase of international application PCT/EP2004/002357, filed 8 Mar. 2004, which designated the U.S., the entire content of which is hereby incorporated by reference.

FIELD OF INVENTION

The invention relates to cellular mobile communication networks having unlicensed-radio access networks. The invention has specific relevance to paging within the coverage area of an unlicensed-radio access network.

BACKGROUND ART

In any cellular mobile communication system, such as a GSM network, mobility management, i.e. the location of subscribers or mobile stations is handled on different levels. At the topmost level, the home location registers (HLR) hold data on which part of a network a mobile subscriber is roaming in and also which visitor location register (VLR) the mobile subscriber is currently registered with. Visitor location registers (VLR) hold data on which location area (LA) a mobile subscriber is currently in. A location area is controlled by a mobile switching center (MSC) and a number of base station controllers (BSC) and is divided into several cells each representing the coverage area of a base station transceiver (BTS). The location area is broadcast in each cell by the base transceiver station BTS. A roaming mobile station is thus able to detect when it moves from one location area to the next and can inform the visitor location register VLR. However, if the mobile station simply moves from one cell to another within the same location area the visitor location area is not informed. This means that in order to locate a mobile station within the network the core network knows only which location area the mobile is in and must page the mobile in all cells within this location area.

Conventional cellular networks can be extended by adding access networks that utilise a low power unlicensed-radio interface to communicate with mobile stations. These access networks are designed to be used together with the core elements of a standard public mobile network and consist essentially of plug-in low-power unlicensed radio transceivers, or access points, each designed to establish an unlicensed radio link with a mobile station MS and a controller or interface node connecting the unlicensed radio transceivers with the mobile core network. Suitable unlicensed-radio formats include digital enhanced cordless telecommunications (DECT), wireless LAN and Bluetooth. An adapted mobile handset capable of operating over both the standard air interface (e.g. the Um interface) and the unlicensed-radio interface means that the subscriber requires only one phone for all environments. The access network is constructed so that the core elements, such as the mobile switching centers MSC, of the public mobile network views the interface node as a conventional base station controller BSC. Such an access network and the mobile station for use with this access network are described in European patent application No. EP-A-1 207 708.

The low power and resultant low range of the unlicensed-radio interface means that several such access networks may be provided in relatively close proximity, for example one access network per floor of an office building or in a private home. The connection between the unlicensed-radio transceivers and the associated controller is preferably provided by a fixed broadband network. Preferably communication over this network uses the internet protocol IP, which greatly facilitates the installation of the access network, permitting a subscriber to plug-in an unlicensed-radio transceiver in his own home and even move it temporarily to an alternative location and consequently install an unlicensed-radio access point himself. The combination of the small size of the access point coverage areas and the ease with which it can be installed and moved means that each access point controller will be controlling a very large but frequently changing number of cells compared to the equivalent base station controller of a conventional cellular network. Consequently when a mobile station roaming somewhere in the unlicensed radio access network must be paged by the core network, the signalling load on the access point controller will be very high due to the large number of cells and access points implicated.

BRIEF SUMMARY OF THE INVENTION

In the light of the above problems it is an object of the present technology to provide an unlicensed-radio access network capable of locating a mobile station in response to a paging signal from the core network without undue signalling load.

Specifically, the unlicensed-radio access network is connected to a core network portion of a licensed mobile cellular network and includes an access controller connected to the core network and a fixed broadband network connected to the access controller and having a plurality of access points. Each access point defines a mini-cell coverage area and supports an unlicensed-radio interface permitting communication between mobile stations located within a respective mini-cell and the access controller. In accordance with an example embodiment, the access controller is associated with one or more location areas in the licensed-radio mobile cellular network and comprises a database for storing the identification of mobile stations in association with address information on the fixed broadband network or at least one access point for each mobile station.

The provision of a database for associating the identification of the mobile station with a broadband network address or the access point via which the mobile station communicates with the access network essentially provides an intermediate level of mobility management. In this way the access network can actively direct messages from the core network towards a specific address, access point or group of access points to reduce the amount of signalling to and from the access points.

The access points may either comprise separate entities capable of establishing a connection with the access controller even when no mobile station is located in its coverage area, or they may be essentially transparent access points or nodes to the broadband network that simply relay messages between a mobile station and the access controller while providing the conversion between the unlicensed-radio interface and the fixed broadband network. In this latter case, the mobile stations will be assigned a network address on the broadband network, since the access points are not recognised as separate entities by the access controller.

Preferably, the access controller is adapted to receive from the core network portion a paging message containing the identification of a mobile station located in the associated location area, to identify the network address or access point associated with the identified mobile station and to transmit the paging message to the identified access point or points only.

In accordance with an example embodiment, the database is updated without the involvement of the core network. Specifically, the access network controller is adapted to receive from a mobile station a message registering identification data for the mobile station and to store the new identification data in the database in association with information concerning an access point communicating with said mobile station. Similarly, the access controller is adapted to delete the identification data when the mobile station is no longer communicating with it. This may be on receipt of a message from the access point that said mobile station is no longer communicating with said access point. Alternatively, the access controller may monitor the connection established with a mobile station and determine when this connection is no longer maintained.

BRIEF DESCRIPTION OF THE DRAWINGS

Further objects and advantages of the present technology will become apparent from the following description of the preferred embodiments that are given by way of example with reference to the accompanying drawings. In the figures FIG. 1 schematically depicts parts of a GSM network modified to include an unlicensed-radio access network, FIG. 2 schematically depicts the system of location areas in the modified GSM network of FIG. 1, and FIG. 3 schematically illustrates the unlicensed access network in accordance with an first example embodiment, and FIG. 4 schematically illustrates the unlicensed access network in accordance with a second example embodiment wherein the unlicensed-radio access network has transparent access points.

DETAILED DESCRIPTION OF THE DRAWINGS

Figure 1:
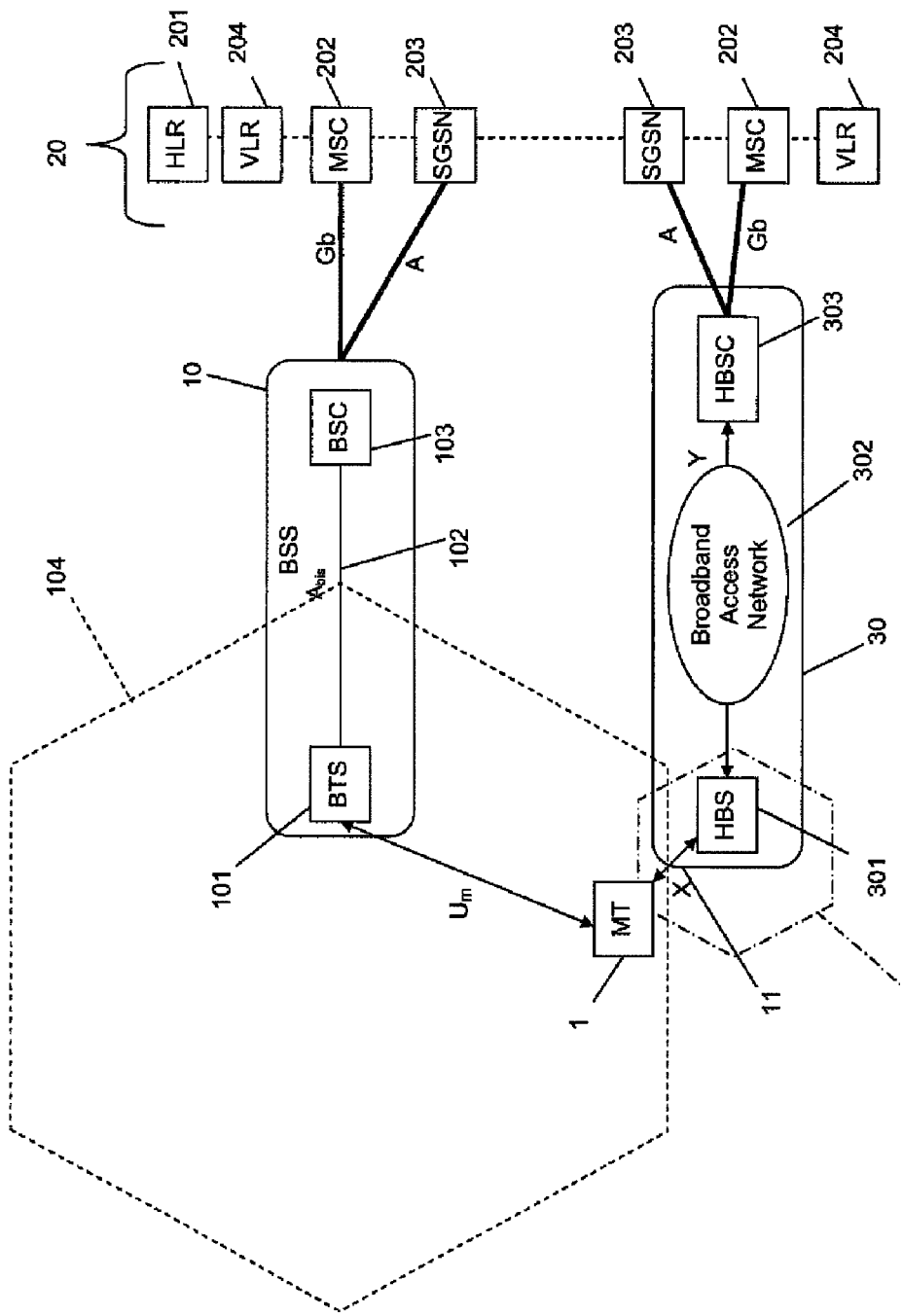

FIG. 1 schematically depicts parts of a conventional GSM network. This network is essentially divided into a core network portion 20 and an access portion 10. The elements of the core network illustrated in the figure include the mobile switching centers or MSCs 202, associated home location register HLR 201 and visitor location register VLR 204. The function and structure of these conventional GSM architecture elements are known to those in the art and will not be described in further detail here. The core network also supports the General Packet Radio Service (GPRS), and to this end serving GPRS support nodes (SGSN) 203 are illustrated. Although not illustrated in the figure, it will be understood by those skilled in the art that the core network portion may include access to other mobile and fixed-line networks, such as ISDN and PSTN networks, packet and circuit switched packet data networks such as intranets, extranets and the Internet through one or more gateway nodes.

The access portion essentially comprises base station subsystems BSS 10, one of which is illustrated in FIG. 1, which communicate via defined fixed standard A and Gb interfaces with MSCs 202 and SGSNs 203, respectively in the core network portion 20. Each base station subsystem BSS 10 includes a base station controller BSC 103 which communicates with one or more base transceiver stations BTS 101 via the defined $A_{bis}$ air interface 102. The base transceiver stations 101 communicate with mobile terminals MS 1 over the GSM standard $U_m$ radio air interface. It will be understood that while the BTS 101 and BSC 103 are depicted as forming a single entity in the BSS 10, the BSC 103 is often separate from the BTSs 101 and may even be located at the mobile services switching centre MSC 202. The physical division depicted in FIG. 1 serves to distinguish between the parts of the network making up the access network portion 10 and those that form the core network portion 20.

In addition to the standard access network portion provided by the BSS's 10 the network depicted in FIG. 1 further includes a modified access network portion 30 shown in the lower half of the figure. Hereinafter this will be described as an unlicensed-radio access network portion 30.

The components comprising this unlicensed-radio access network portion 30 also enable the mobile terminal 1 to access the GSM core network portion, and through this, other communication networks via an unlicensed-radio interface X, represented in FIG. 1 by the bi-directional arrow 31. By unlicensed-radio is meant any radio protocol that does not require the operator running the mobile network to have obtained a license from the appropriate regulatory body. In general, such unlicensed-radio technologies must be low power and thus of limited range compared to licensed mobile radio services. This means that the battery lifetime of mobile terminals will be greater. Moreover, because the range is low the unlicensed-radio may be a broadband radio, thus providing improved voice quality. The radio interface may utilise any suitable unlicensed-radio protocol, for example a wireless LAN protocol or Digital Enhanced Cordless Telecommunications (DECT). Preferably, however, Bluetooth radio is utilised, which has a high bandwidth and lower power consumption than conventional public mobile network radio.

The Bluetooth standard specifies a two-way digital radio link for short-range connections between different devices. Devices are equipped with a transceiver that transmits and receives in a frequency band around 2.45 GHz. This band is available globally with some variation of bandwidth depending on the country. In addition to data, up to three voice channels are available. Each device has a unique 48-bit address from the IEEE 802 standard. Built-in encryption and verification is also available.

The element of the fixed access network portion 30 adapted to communicate across the Bluetooth interface is designated a local or home base station (HBS) 301. This element handles the radio link protocols with the mobile terminal MS 1 and comprises radio transceivers that define a cell in a similar manner to the operation of a conventional GSM base station transceiver BTS 101. The home base station HBS 301 is controlled by a home base station controller HBSC 303, which communicates with a mobile service switching centre MSC 202 over the GSM standard A interface and also with a serving GPRS support node SGSN 203 over a standard Gb interface, if available in the core network portion. The interface between the home base station HBS 301 and its home base station controller HBSC 303 is designated a Y-interface. The home base station controller HBSC 303 provides the connection between the MSC 202 or SGSN 203 and mobile terminal 1. The joint function of the home base station HBS 301 and the home base station controller HBSC 303 emulates the operation of the BSS 10 towards the SGSN 203 and MSC 202. In other words, when viewed from the elements of the core network 20 such as the mobile service switching centre (MSC) 202 and the serving GPRS support node (SGSN) 203, the fixed access network portion 30 constituted by the home base stations HBS 301 and the home base station controller HBSC 303 looks like a conventional access network portion 10.

The applications that run on the mobile terminal MS 1 on top of the public mobile network radio interfaces also run on top of Bluetooth radio between the mobile terminal 1 and the home base station HBS 301.

The interface between the home base station HBS 301 and the home base station controller HBSC 303 which is designated Y in FIG. 1 is preferably provided by a fixed link. The home base station 301 is intended to be a small device that a subscriber can purchase and install in a desired location such as the home or an office environment to obtain a fixed access to the mobile network. However, they could also be installed by operators in traffic hotspots. In order to reduce the installation costs on the part of the operator, the interface between the home base station 301 and the home base station controller 303, which is designated interface Y in FIG. 1 therefore preferably exploits an already existing connection provided by a fixed network 302. Preferably this network is a broadband packet-switched network. Suitable networks might include those based on ADSL, Ethernet, LMDS, or the like. Home connections to such networks are increasingly available to subscribers. Although not shown in FIG. 1, the home base station HBS 301 will be connected to a network terminal giving access to the fixed network 302, while the home base station controller HBSC 303 may be connected to an edge router ER of the network 302 that also links the fixed network 302 to other networks such as intranets and the internet. IP is used for communication between the home base station HBS 301 and home base station controller HBSC 303 over the fixed network 302 to render the transport of data independent of the network type. The link between the home base station HBS 301 and the home base station controller HBSC 303 is preferably always open, so that this connection is always available without the need for reserving a channel. While the fixed network 302 is preferably an IP-based network, ATM-based networks could also be used. In particular when DSL technologies are used in this network, they could be used directly on top of the ATM layer, since they are based on ATM. Naturally, an ATM based network could also be used to transport IP, serving as a base layer.

The home base station HBS 301 is installed by plugging it in to a port of a suitable modem, such as an ADSL or CATV modem, to access the fixed network 302. The port is in contact with an intranet that is either bridged or routed on the IP level. Thus standard protocols, such as IP, DHCP, DNS and the like are used. The home base station HBS 301 connected to the modem utilises these standard protocols and functions to establish a connection with a home base station controller HBSC 303. A sign-on procedure for a home base station 301 connecting for the first time or reconnecting to a home base station controller HBSC 303 is for example described in European patent application No. EP-A-1 207 708. Prior to establishing a voice or data connection between the home base station controller HBSC 303 and a home base station HBS 301 a static TCP connection is established between these elements across the fixed broadband network 302.

The base stations 101 and 301 in both the conventional access network 10 portion and the unlicensed-radio access network portion 30 define a coverage area depicted in FIG. 1 by hexagonal cells 104, 304, respectively. While the relative dimensions of these cells are not accurate in the figure, it is nevertheless clear that the cell coverage of a conventional BTS 101 is far greater than the mini-cell generated by a comparatively low power home base station HBS 301. A mini-cell will have a diameter of around 50 to 200 m.

Figure 2:
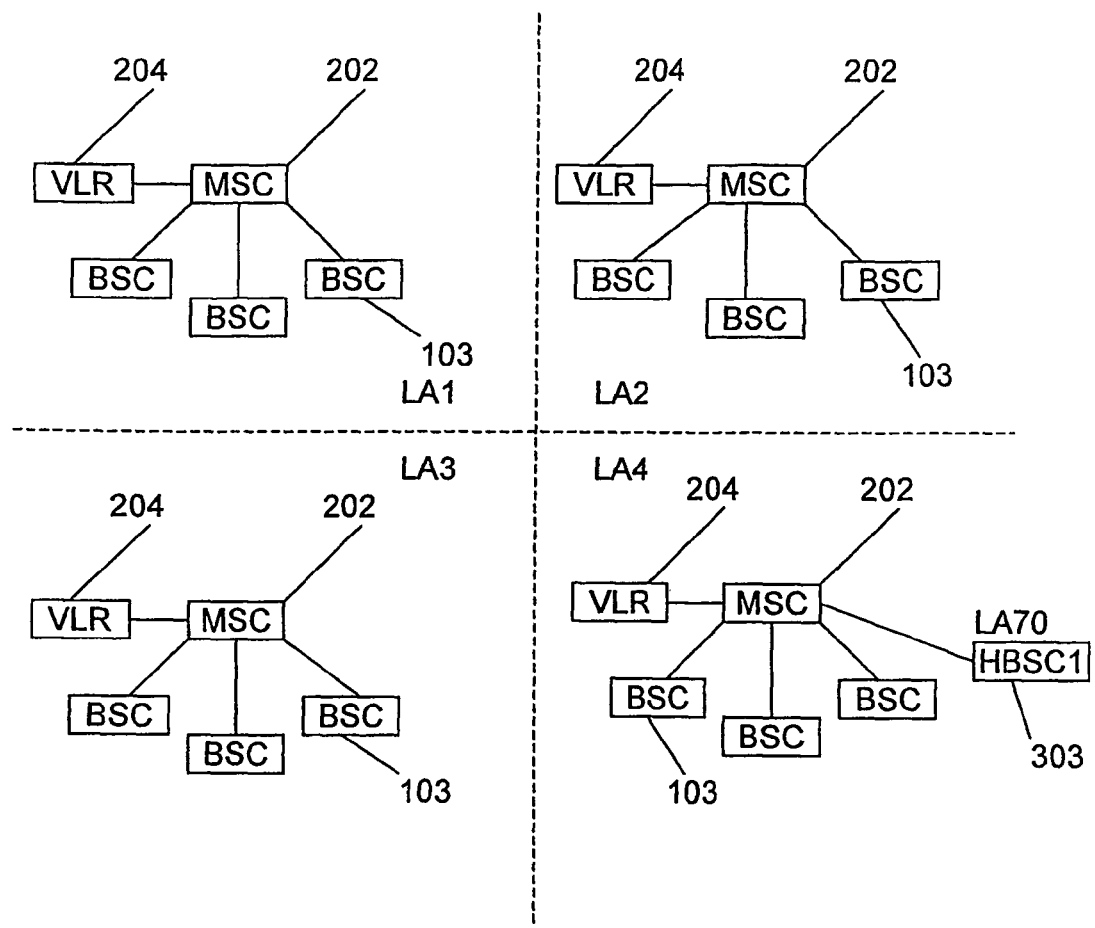

The GSM network is divided into several location areas LA, which are commonly separated geographically. A simplified logical structure of an extended GSM network showing the location areas is illustrated in FIG. 2. Four location areas, LA1, LA2, LA3 and LA4 are illustrated in FIG. 2. One mobile services switching center MSC 202 controls a location area LA and is connected to an associated visitor location register 204. All base station controllers BSCs 103 connected to this mobile services switching center MSC 202 are assigned to this location area LA. This is also valid for all base station transceivers BTS 101 associated with each base station controller BSC 103, although these are not illustrated in FIG. 2 for reasons of clarity. While some mobile services switching centers MSC 202 may take care of more than one location area LA, location areas are not split between mobile services switching centers MSC 202.

The mobile switching center MSC 202 in location area LA4 also controls a home base station controller HBSC 303. However, the home base station controller HBSC 303, and all home base stations HBS 301 controlled by this home base station controller 303 are assigned a separate unique location area LA70.

The visitor location register VLR 204 connected to each mobile services switching center MSC 202 contains information about the mobile stations MS 1 that are located in the location areas within the control of the associated mobile switching center MSC 202. The base station transceivers BTS 101 in each location area broadcast the location area to mobiles within the cell 104. A mobile roaming within the network is thus able to detect which location area it is in. When a mobile station 1 moves from a cell in one location area to a cell in a different location area, it sends a location area update message to the core network. The information corresponding to this mobile is then updated in the corresponding visitor location register VLR 204. If the visitor location register VLR 204 is different from the last visitor location register the mobile station was registered with, this information is also updated in the home location register HLR 201. When the core network needs to locate a mobile station, the location area information is retrieved from the current visitor location register VLR 204 and a paging message is then despatched to the relevant base station controllers BSC 103, depending on how paging is handled in the core network. For example if global paging is carried out the paging message is sent to all base station controllers BSC 103. Alternatively, a paging addressed may be to the mobile switching center MSC 202 controlling the identified location area, which in turn forwards this paging message to all cells 104 (i.e. all base station transceivers BTS 101) within that location area.

Figure 3:
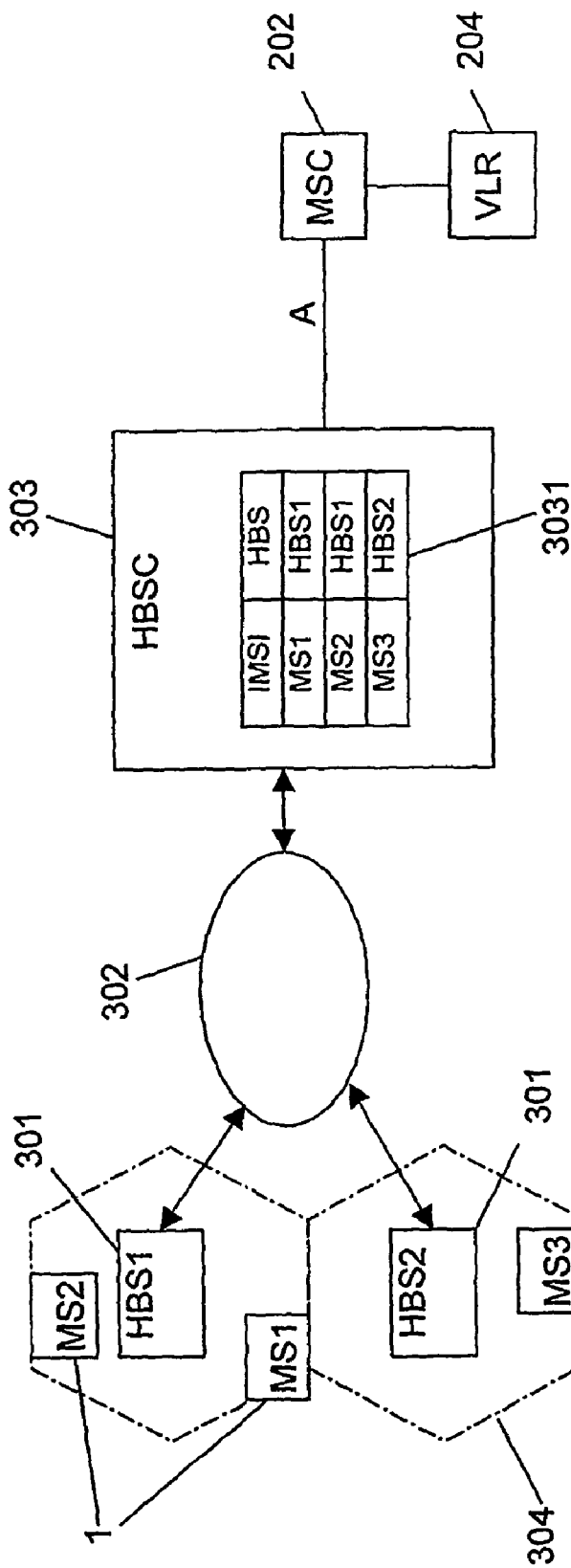

On the level of the core network 20, the same procedure is followed when a mobile station roams into the coverage area of an unlicensed-radio access point or home base station HBS 301. All home base stations HBS 301 belonging to the same access network, i.e. all home base stations HBS 301 connected to the same access point controller or home base station controller HBSC 303, are assigned to the same location area or group of location areas. A location area update message will thus be sent to the core network by the mobile station MS 1 when the mobile station first enters a mini-cell 304. The paging of the mobile station is also identical from the core network side. The paging message is sent to the home base station controller HBSC 303. However, at this point the similarity with a conventional GSM cellular network ceases. Reference is now made to FIG. 3, which illustrates the unlicensed-radio access network 30 and specifically the home base station controller 303 in more detail.

The unlicensed-radio access network depicted in FIG. 3 includes a home base station controller HBSC 303 connected via a fixed broadband network 302 to two access points or home base stations HBS1 and HBS2 301. Three mobile stations MS1-MS3 1 are located in the mini-cells 304 of these home base station controllers HBS 301. The home base station controller HBSC 303 is connected to a mobile services switching center MSC 202, which in turn has access to a visitor location register VLR 204. The remaining elements of a conventional cellular core network 20 are omitted from the figure. The home base station HBSC 303 in FIG. 3 comprises a database 3031 illustrated schematically as a table in the figure. This database 3031 contains identification information for all mobile stations operating in the coverage area of the unlicensed-radio access network 30. The identification information is preferably the International Mobile Subscriber Identity IMSI. In any event, the identification information must be the same or at least indicative of the identification used by the core network 20 for each mobile station MS 1. This information is conventionally signalled by a mobile station 1 to a base station when it is within the respective cell. In this database 3031 the mobile station identification information is coupled with the identification of the access point or home base station HBS 301 controlling the mini-cell 304 the mobile station is currently located in. This home base station identification may be an identifier assigned to this home base station HBS 301 or it may indicate the network address of the home base station HBS on the fixed broadband network 302. By way of example, mobile station MS1 is located in the mini-cell of home base station 1. Consequently, the IMSI of this mobile station MS1 is mapped to the identification of home base station 1 HBS1 in the home base station controller database 3031. Similarly, the IMSI of mobile station MS2 is mapped to home base station HBS1 and the IMSI of mobile station MS3 is mapped to home base station HBS2.

In this way the home base station controller HBSC 303 upon receiving a paging message from the core network 20 is able to retrieve the current location of the mobile station MS 1 from the database 3031 and forward the paging message to the relevant home base station HBS 301 only. The paging message is transmitted via the established static TCP connection between the home base station controller HBSC 303 and the home base station HBS 301. As a result of the small size of the coverage areas of each home base station HBS 301 the number of mini-cells under the control of a single home base station controller HBSC 303 may number thousands. Moreover, this number may change constantly as a consequence of the ease with which the home base stations HBS 301 can be added or removed from the unlicensed-radio access network 30.

Enabling the home base station controller HBSC 303 to forward paging messages to the particular home base station HBS 301 in contact with a mobile station MS 1 thus means that the amount of signalling that would otherwise be required between the home base station controller HBSC 303 and all home base stations HBS 301 is greatly reduced.

Preferably, the home base station controller HBSC 303 does not simply forward the paging message from the core network to the targeted home base station HBS but rather addresses the mobile station itself. This avoids the paging message being broadcast in the home base station HBS 301 coverage area and still further reduces the signalling traffic involved.

The home base station controller database 3031 is updated in the following manner. When a mobile station MS 1 appears in the coverage area or mini-cell 304 of a home base station HBS 301 and is authorised to use its services, the identification of the mobile station MS 1 or IMSI is sent to the home base station HBS 301 over the unlicensed-radio interface X. The mobile station identification IMSI is then sent to the home base station controller HBSC 303, where it is stored in the database 3031 in association with information on the home base station HBS 301. It is noted that while the database illustrated in FIG. 3 shows the mobile station identifier and the home base station identifier as two sets of data, this is only one possible configuration. A further option would be to store the mobile station identification information at a specific address, location or field that is associated with the home base station HBS 301.

When the mobile station MS 1 leaves the coverage area of the home base station HBS 301 or is turned off while in this coverage area, the home base station HBS 301 informs the home base station controller HBSC 303 that the mobile station is no longer reachable and the mobile station identification information is updated in the home base station controller database 3031. Alternatively the home base station need not actively signal the cessation of communication with the mobile station, rather the static TCP connection between the home base station and home base station controller can be dropped. As discussed earlier, communication between the home base station HBS 301 and home base station controller HBSC 303 is conducted over a static TCP/IP connection. This connection requires an exchange of Keep Alive-messages to keep the connection alive. When a mobile station MS 1 is turned off or has left the coverage area of a home base station HBS 301, the home base station HBS 301 has no reason to maintain the static TCP connection as no further messages are being received from the mobile station MS 1. The home base station controller HBSC 303 will recognise that no further Keep Alive-messages are being received from the home base station HBS 301 to maintain the static TCP connection and can consequently remove the address and identification data related to the mobile station MS on this home base station HBS 301.

In an alternative embodiment, the database 3031 does not store the mobile station identifier and access point address on a one-to-one basis but rather associates mobile station identifiers with a group of access points 301. These access points 301 could, for example, be clustered together and thus be in a relatively small geographical area. In this manner, the home base station controller HBSC 303 would forward a paging message received from the core network 20 to a specific group of mini-cells only. This arrangement has the advantage the that database could be fragmented into several sections, each section being devoted to a specific geographical area, or possible to a specific subscriber. The update procedures described above would then be necessary only when a mobile station MS 1 moved out of the coverage area of a cluster of home base stations 301.

The above description of an unlicensed-radio access network includes home base stations HBS 301 that function as end points in the access network 30 actively establish and maintain a connection with the home base station controller HBSC 303. However, in an alternative embodiment of the access network 30, the home base stations HBC 301 are simply transparent access points for a mobile station MS using an unlicensed radio interface to the fixed broadband network 302 without specific functionality relating to the unlicensed-radio access network 30. With this arrangement, the mobile station MS 1 is provided with the necessary functionality to communicate directly with the home base station controller HBSC 303 over an unlicensed-radio interface and the broadband network via the access point. Accordingly, the mobile station MS itself establishes a static TCP connection with the home base station controller HBSC over the fixed broadband network 302. Moreover, until such a connection is established there is no communication between the access point 301 and the home base station controller HBSC 303. The home base station controller HBSC 303 holds no information on the access point 301.

When the unlicensed-radio access network takes this form, the home base station controller database 303 1 must be updated with information concerning the mobile station MS 1 only. This information includes the identification or IMSI of the mobile station as well as the fixed broadband network address via which the mobile station communicates. This embodiment is illustrated in FIG. 4.

Figure 4:
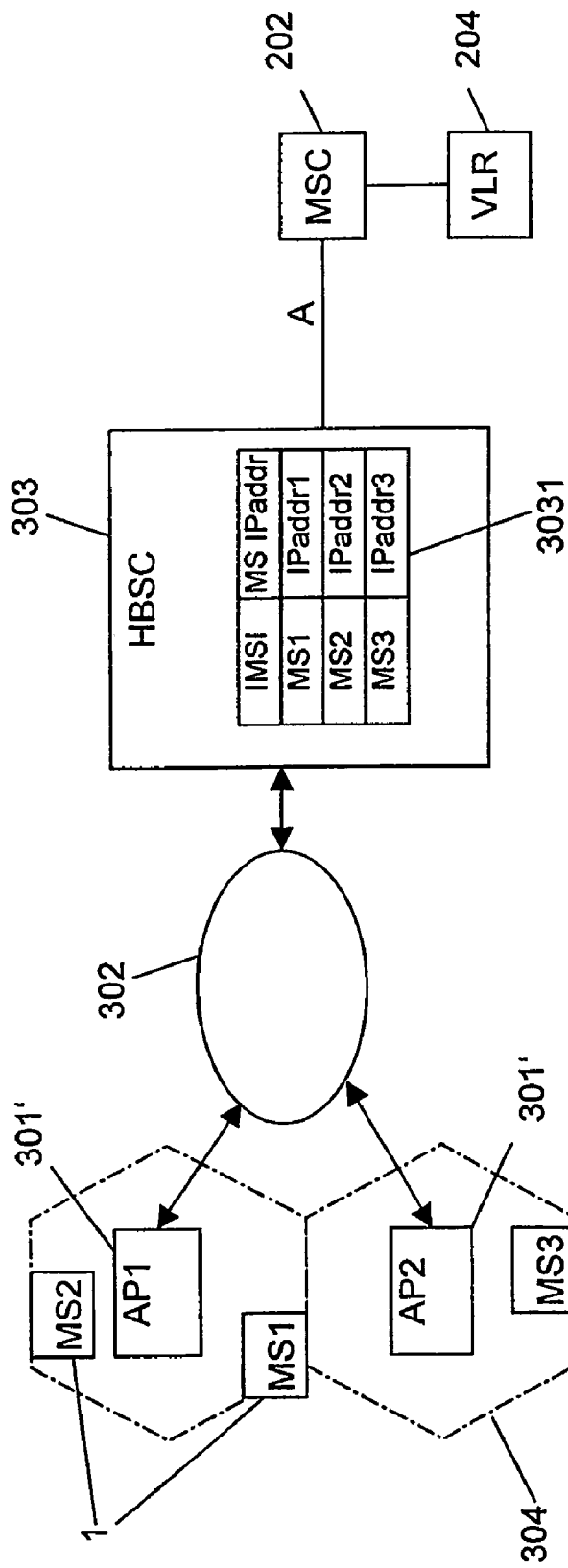

FIG. 4 shows the same elements as FIG. 3 with the exception that access points AP 301' replace home base stations HBS 301. The remaining elements are the same as in FIG. 3 and a detailed description of these elements will not be given here. With this modification in the unlicensed-radio access network 30, the home base station controller database 3031 now holds information identifying a mobile station MS 1 connected to the access network (IMSI) as well as the network or IP address "IPaddr" of this mobile station on the fixed broadband network. In the figure, mobile station MS1 and mobile station MS2 have been assigned different IP addresses, namely IPaddr1 and IPaddr2, respectively, although they communicate with the home base station controller via the same access point AP1. It will be understood, however, that the actual network address may be the same for both mobile stations, but that the identification of each mobile station is then used to address a specific mobile station.

In this embodiment also the home base station controller database 3031 holds data only on those mobile stations that are active within the coverage area of the unlicensed-radio access network 3. Each mobile station MS identity is stored with the associated network address when the mobile station establishes contact with the home base station controller HBSC 301. Unlike a home base station 301, a transparent access point 301' is not able to detect when a mobile station MS 1 has left its coverage area or when a mobile station is switched off, nor is it able to communicate independently with the home base station controller HBSC 303. For this reason, a signalling mechanism is used between the mobile station MS 1 and the base station controller HBSC 303 indicating that the connection between these two is alive. When the home base station controller HBSC 303 determines that a Keep Alive-message has not been received from the mobile station 1 within a certain time period or in response to another message, it will delete the corresponding entry in the database 3031. As described above with reference to FIG. 3, this messaging may be part of the messaging required to keep the static TCP connection alive between the mobile station and the home base station controller.

The above detailed description of cell management has referred only to GSM networks as a conventional public mobile network. It will be understood by those skilled in the art, however, that the above description applies equally to other conventional public mobile networks, such as UMTS or CDMA2000.

The invention claimed is:

1. An unlicensed-radio access network connected to a core network portion of a licensed mobile network, said unlicensed-radio access network comprising:
   an access controller connected to said core network portion,
   a broadband network connected to said access controller and comprising a plurality of access points, each said access point defining a mini-cell coverage area and supporting an unlicensed-radio interface permitting communication between mobile stations located within a respective mini-cell and said access controller,
   wherein said access controller:
   is adapted to communicate directly with mobile stations located in a mini-cell;
   is assigned at least one location area in said licensed radio mobile network, said location area being separate and unique to said unlicensed radio access network;
   comprises a database for storing an identification of a mobile station in association with a network address for said mobile station on said broadband network, wherein said network address is unique to said mobile station so as to enable said access controller to page said mobile station for voice calls individually, said access controller being adapted to delete said identification data when said mobile station ceases to operate in the coverage areas of said unlicensed radio access network; and
   is adapted to receive from said core network portion a paging message containing the identification of a mobile station located in the assigned location area, to identify the network address associated with said identified mobile station, and to transmit said paging message to said identified network address only.

2. The access network as claim 1, wherein said access controller is adapted to receive from a mobile station a message registering identification data for said mobile station and to store said identification data in said database in association with address information for said mobile station on said broadband network.

3. The access network as claimed in claim 1, wherein said mobile station identification data is the international mobile subscriber identity (IMSI).

4. The access network as claimed in claim 1, wherein said access network controller is adapted to determine whether a connection with said mobile station is maintained and to delete said identification data on determining that said connection is no longer maintained.

5. A method in an access controller of an unlicensed-radio access network , wherein said access controller is connected to a broadband network comprising a plurality of access points and to a core network portion of a licensed-radio cellular network and being adapted to communicate with mobile stations over an unlicensed-radio interface via said access points, said method comprising:
   establishing communication with a mobile station using a network address on said broadband network for said mobile station,
   receiving identification information specific to a mobile station from said mobile station,
   registering said mobile station identification information in association with said mobile station network address on said broadband network,
   wherein said network address is unique to said mobile station so as to enable said access controller to page said mobile station for voice calls individually,
   determining when a connection established with said mobile station is no longer maintained and deleting said mobile station identification information when it is determined that a connection is no longer maintained;
   receiving a message from said core network portion paging a mobile station,
   retrieving mobile station identification information registered for said paged mobile, and
   forwarding said paging message only to the network address identified in association with said registered mobile station identification information.

6. The access network as claimed in claim 1, wherein the broadband network is a fixed broadband network.

7. The method as claimed in claim 5, wherein the broadband network is a fixed broadband network.

8. An access controller of an unlicensed-radio access network, said access controller being connected to a core network portion of a licensed mobile network and to a broadband network having a plurality of access points, each said access point defining a mini-cell coverage area and supporting an unlicensed-radio interface permitting communication between mobile stations located within a respective mini-cell and said access controller, wherein said access controller:
- is adapted to communicate directly with mobile stations located in a mini-cell;
- is assigned at least one location area in said licensed radio mobile network, said location area being separate and unique to said unlicensed radio access network;
- comprises a database for storing an identification of a mobile station in association with a network address for said mobile station on said broadband network, said network address being unique to said mobile station such as to enable said access controller to page said mobile station for voice calls individually, said access controller being adapted to delete said identification data when said mobile station ceases to operate in the coverage areas of said unlicensed radio access network; and
- is adapted to receive from said core network portion a paging message comprised by the identification of a mobile station located in the associated location area, to identify the network address associated with said identified mobile station, and to transmit said paging message to said identified network address only.

9. The access controller as claimed in claim 8, wherein said mobile station identification data is the international mobile subscriber identity (IMSI).

10. The access controller as claimed in claim 8, wherein said access network controller is adapted to determine whether a connection with said mobile station is maintained and to delete said identification data on determining that said connection is no longer maintained.

* * * * *

UNITED STATES PATENT AND TRADEMARK OFFICE
CERTIFICATE OF CORRECTION

| | | |
|---|---|---|
| PATENT NO. | : 8,112,082 B2 | Page 1 of 1 |
| APPLICATION NO. | : 10/591953 | |
| DATED | : February 7, 2012 | |
| INVENTOR(S) | : Nylander et al. | |

It is certified that error appears in the above-identified patent and that said Letters Patent is hereby corrected as shown below:

In Column 1, Lines 30-31, delete "base station transceiver (BTS)." and insert -- base transceiver station (BTS). --, therefor.

In Column 2, Line 19, delete "BRIEF SUMMARY OF THE INVENTION" and insert -- BRIEF SUMMARY --, therefor.

In Column 3, Line 26, delete "and".

In Column 4, Lines 41-42, "base station transceiver BTS" and insert -- base transceiver station BTS --, therefor.

In Column 6, Lines 1-2, delete "base station transceivers" and insert -- base transceiver stations --, therefor each occurrence throughout the specification.

In Column 6, Line 63, delete "MS1-MS3 1" and insert -- MS1-MS3 --, therefor.

In Column 8, Lines 37-38, delete "the that" and insert -- that the --, therefor.

In Column 8, Line 66, delete "303 1" and insert -- 3031 --, therefor.

In Column 10, Line 21, in Claim 2, delete "as" and insert -- as claimed in --, therefor.

Signed and Sealed this
Twenty-sixth Day of June, 2012

David J. Kappos
*Director of the United States Patent and Trademark Office*